(12) United States Patent
Kim

(10) Patent No.: US 8,059,237 B2
(45) Date of Patent: Nov. 15, 2011

(54) LCD DEVICE AND METHOD FOR MANUFACTURING THE SAME

(75) Inventor: Jong-Seong Kim, Pohang-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/391,592

(22) Filed: Feb. 24, 2009

(65) Prior Publication Data

US 2009/0161050 A1    Jun. 25, 2009

Related U.S. Application Data

(62) Division of application No. 11/486,887, filed on Jul. 13, 2006, now Pat. No. 7,515,799.

(30) Foreign Application Priority Data

Jul. 13, 2005    (KR) .............................. 2005-0063052

(51) Int. Cl.
*G02B 6/44* (2006.01)
(52) U.S. Cl. ....................... 349/113; 349/114
(58) Field of Classification Search .................. 349/113, 349/114
See application file for complete search history.

(56) References Cited

U.S. PATENT DOCUMENTS

| | | | | |
|---|---|---|---|---|
| 6,195,140 B1 * | 2/2001 | Kubo et al. | ..................... | 349/44 |
| 6,330,047 B1 * | 12/2001 | Kubo et al. | ................... | 349/147 |
| 6,452,654 B2 * | 9/2002 | Kubo et al. | ................... | 349/114 |
| 7,015,996 B2 * | 3/2006 | Sakamoto et al. | ............ | 349/113 |
| 7,382,335 B2 * | 6/2008 | Miyawaki et al. | ................ | 345/7 |
| 7,609,343 B2 * | 10/2009 | Sakamoto et al. | ............ | 349/114 |
| 2001/0020991 A1 * | 9/2001 | Kubo et al. | ................... | 349/113 |
| 2003/0044720 A1 * | 3/2003 | Lai | ................. | 430/311 |
| 2003/0122980 A1 * | 7/2003 | Jin et al. | .......................... | 349/43 |
| 2005/0122453 A1 * | 6/2005 | Jang et al. | ..................... | 349/114 |
| 2005/0151892 A1 * | 7/2005 | Sakurai et al. | ................. | 349/40 |

* cited by examiner

*Primary Examiner* — K. Cyrus Kianni
(74) *Attorney, Agent, or Firm* — Innovation Counsel LLP

(57) ABSTRACT

A display panel for a LCD device includes a substrate, a plurality of thin film transistors formed on the substrate, a passivation layer formed on the thin film transistors, a plurality of reflective patterns formed on the passivation layer, transparent electrodes formed on the reflective patterns, and reflective films formed on the transparent electrode. The reflective patterns and the reflective films are formed in a reflective area of the passivation layer. The reflective patterns are formed by position transition of two polymer films having different polarities. The display panel having the reflective patterns increase light reflectance and reduce cost for manufacturing an LCD.

6 Claims, 15 Drawing Sheets

LCD DEVICE AND METHOD FOR MANUFACTURING THE SAME

RELATED APPLICATIONS

This application is a divisional of U.S. patent application Ser. No. 11/486,887, filed Jul. 13, 2006, which claims priority of Korean Patent Application No. 2005-0063052, filed Jul. 13, 2005, the disclosures of which are herein incorporated by references for all purposes.

FIELD OF THE INVENTION

The present invention relates to display devices in general, and in particular, to LCD devices having improved light reflectance and the method for manufacturing thereof.

BACKGROUND

Liquid crystal displays (LCDs) are one of the more widely used types of flat panel display devices. An LCD includes two transparent substrates provided with field-generating electrodes (i.e., a pixel electrode and a common electrode) and a liquid crystal (LC) layer interposed therebetween. The LCD displays images by applying voltages to the field-generating electrodes to generate an electric field in the LC layer, which controls the orientation of the LC molecules in the LC layer to effect the polarization of light passing through the layer.

LCDs can be categorized as operating in a "transmissive mode," a "reflective mode," or a "transflective mode", depending on the source of light used by the LC layer to form an image. The transmissive mode LCDs employ light supplied by an internal source, such as a "backlight" assembly contained in the display. The reflective mode LCDs use light supplied by an external source, i.e., ambient light, such as sunlight, or ambient room lighting, as the light source. The transflective mode LCD operates in the reflective mode when the ambient light is sufficient to provide a useful display image and in the transmissive mode when the ambient light is not sufficient to provide a useful image. Therefore, the transflective mode LCD has low power consumption and may be used in low light environments.

The transflective mode LCD and the reflective mode LCD have a reflective film with an uneven and dimpled surface to reflect external light. Generally, the uneven and dimpled surface of the reflective film is formed by underlying reflective patterns formed of a photo-sensitive organic material with low molecular weight. The reflective patterns are formed by coating the photo sensitive organic material, exposing the coated material to light, and then developing the exposed material to light (i.e. photo lithography). However, the reflective patterns may be deformed by the exposure process, e.g., material crosslinking, and by the developing process. Also, the fluidity of the organic material impedes the formation of flat surface between reflective patterns, thereby causing reflected light to interfere between reflective patterns and reduce reflectivity. Furthermore, forming the reflective patterns typically requires multiple photo lithography process steps, which increases manufacturing cost and time.

Therefore, there is a need for LCDs that have improved light reflectance and a method manufacturing thereof.

BRIEF SUMMARY

In accordance with the embodiments thereof described herein, the present invention provides a display panel for a LCD having substantially improved light reflectance properties.

In one such embodiment, the display panel comprises a substrate having a plurality of pixel areas, a plurality of thin film transistors, a passivation layer, and a plurality of reflective patterns, transparent electrodes and reflective films.

Each pixel area is divided into a reflective area and a transmissive area, and the thin film transistor is formed in each pixel area. The passivation layer is formed on the thin film transistor. The reflective patterns and the reflective films are formed selectively on the passivation layer in the area corresponding to the reflective area. The reflective patterns include first and second polymer films having different polarities from each other. The transparent electrodes are conformingly formed on the passivation layer, and the reflective films are formed on the transparent electrodes in the area corresponding to the reflective area.

In another embodiment, an LCD device includes a first display panel, such as in the prior embodiment, a second display panel facing the first display panel and a liquid crystal layer interposed between the first and the second display panels.

The second display panel includes a substrate, color filters formed on the substrate, and a common electrode formed on the color filter.

A method for manufacturing a LCD in accordance with one embodiment of the present invention includes forming a thin film transistor on a substrate, forming a passivation layer on the thin film transistor, forming a first polymer film having different polarity from and on the passivation layer, forming a second polymer film having the same polarity as the passivation layer on the first polymer film, removing a portion of the first and the second polymer films and forming a transmissive area in the passivation layer, heating the first and the second polymer films to form a plurality of reflective patterns, forming a transparent electrode on the reflective patterns, and forming a reflective film on the transparent electrode in the area corresponding to the reflective patterns.

The reflective patterns are formed through a chemical method, such as layer-inversion, which eliminates the need for a patterning process and results in a more simplified manufacturing process. A flat surface is formed between the reflective patterns to prevent interference of the reflected light. Additionally, the reflective patterns are irregular in shape and size to enhance reflectivity. Furthermore, the reflective patterns are not formed of low molecular weight material, thereby reducing the afterimage problem.

A better understanding of the above and many other features and advantages of the improved LCDs of the present invention may be obtained from a consideration of the detailed description of the exemplary embodiments thereof below, particularly if such consideration is made in conjunction with the several views of the appended drawings, wherein like reference numerals are used to identify like elements illustrated in one or more of the figures thereof.

DETAILED DESCRIPTION

Figure 1:
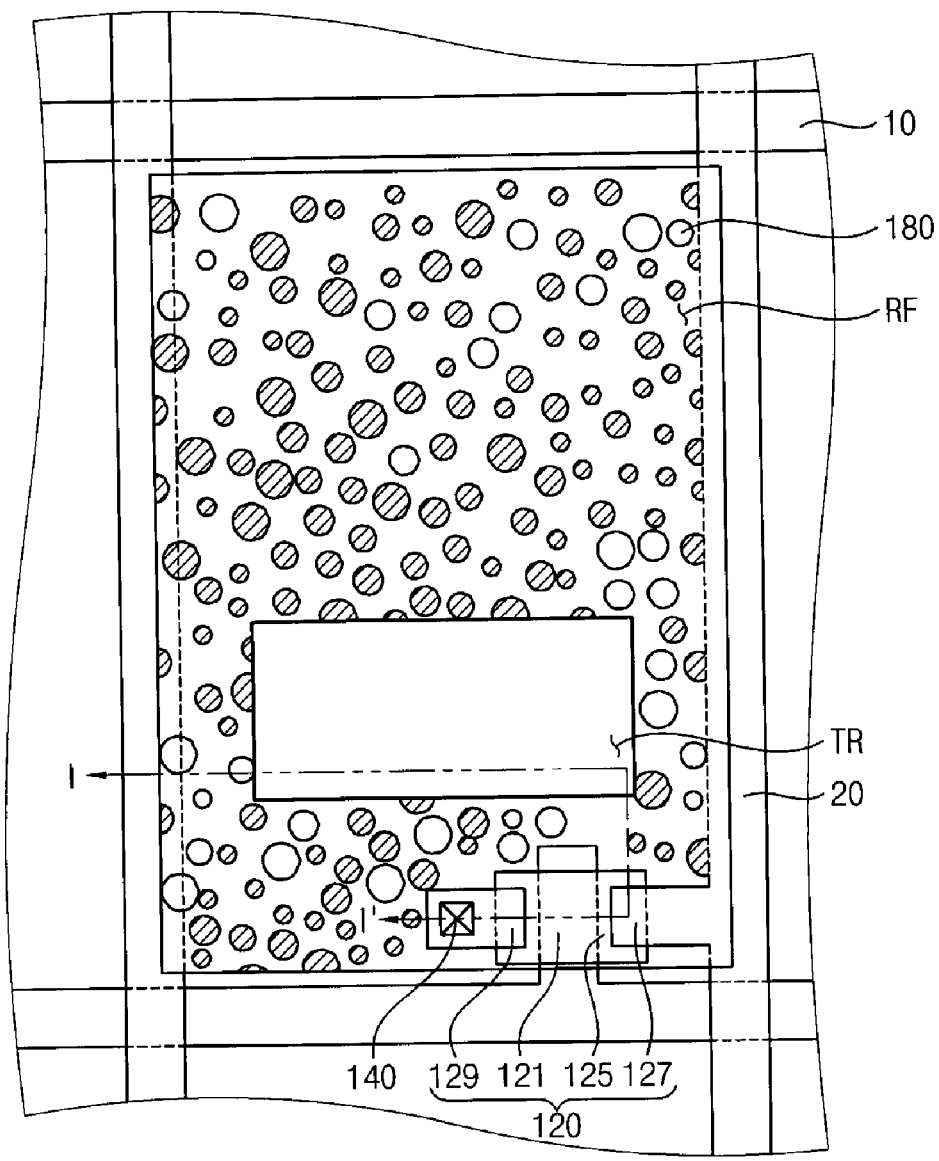
FIG. 1 is a plan view of an embodiment of a display panel in accordance with the present invention.
Figure 2:
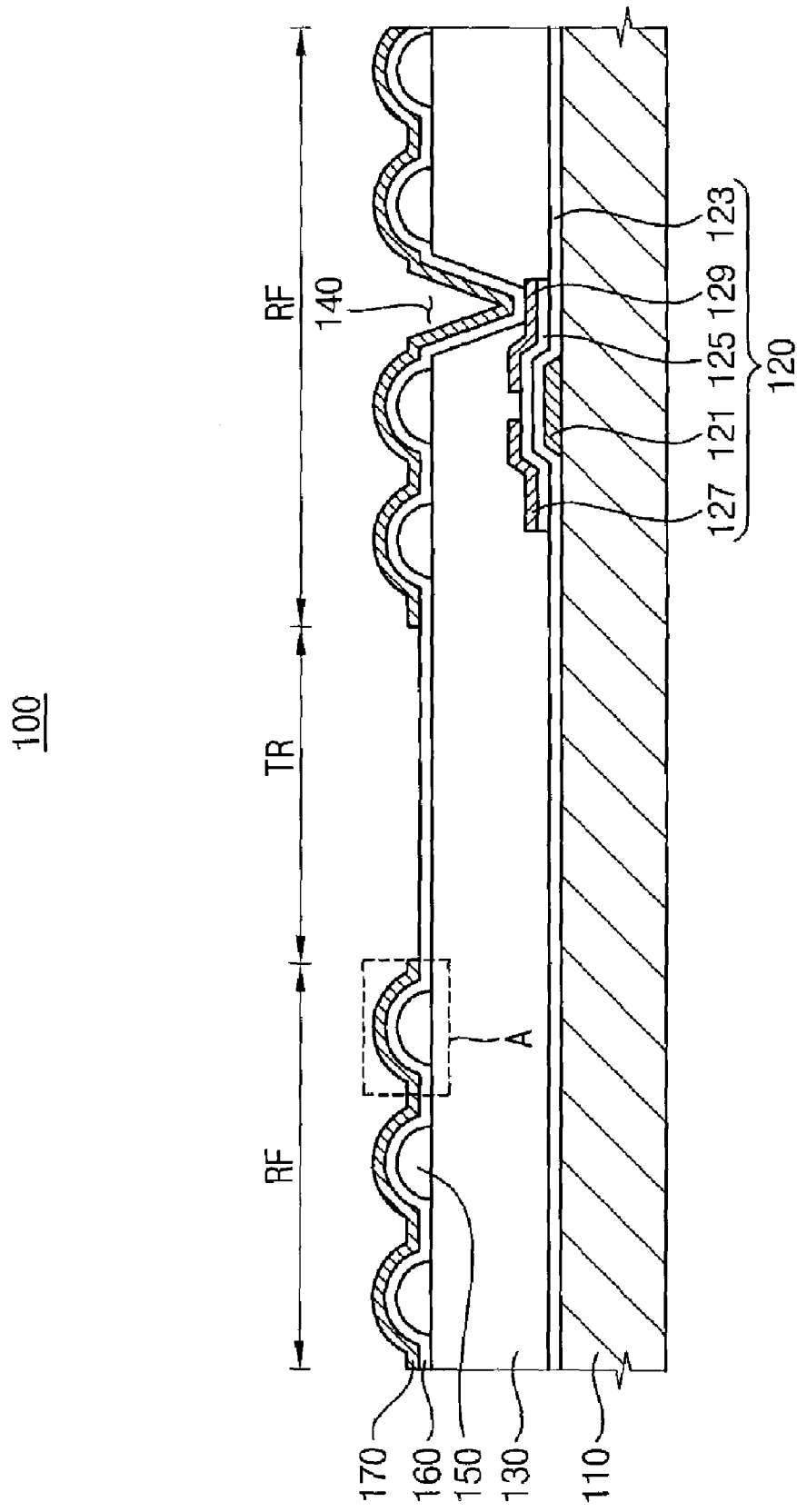
FIG. 2 is a cross-sectional view taken along the line I-I' of the display panel of FIG. 1.

FIG. 1 is a partial plan view of an embodiment of a display panel 100 for a LCD in accordance with the present invention. FIG. 2 is a cross-sectional view taken along the line I-I' of FIG. 1.

Referring to FIGS. 1 and 2, the display panel 100 includes a substrate 110, a plurality of thin film transistors (TFTs) 120, a passivation layer 130, reflective patterns 150, transparent electrodes 160, and reflective films 170. The substrate 110 is a transparent such as a glass.

A plurality of first signal lines 10 and second signal lines 20 are formed on the substrate 110. The first signal lines 10 extend in a first direction and transmit gate signals. The second signal lines 20 extend in a second direction across the first signal lines 10 and transmit data signals. A pixel area is defined by the first signal line 10 and the second signal line 20.

Each TFT 120 includes a gate electrode 121, an insulating layer 123, a semiconductor or channel layer 125, a source electrode 127, and a drain electrode 129. The gate electrode 121 protrudes from the first signal line 10 in the second direction. The insulating layer 123 is formed on the gate electrode 121 and the substrate 110. The semiconductor layer 125 is formed on the insulating layer 123 in a position corresponding to the gate electrode 121. The semiconductor layer 125 is formed of amorphous silicon or poly silicon.

The source electrode 127 is formed on the semiconductor layer 125 and protrudes from the second signal line 20. The drain electrode 129 is also formed on the semiconductor layer 125 and is separated from the source electrode 127.

An ohmic contact layer (not shown) can be formed between the source and the drain electrode 127 and 129 and the semiconductor layer 125 to reduce contact resistance. A channel is formed on the surface of the semiconductor layer 125 when a gate-on voltage is applied to the gate electrode 121 through the first signal line 10. A data signal received from the second signal line 20 is applied to the drain electrode 129 through the channel.

The passivation layer 130 is formed on the substrate 110 and has a plurality of contact holes 140 to expose a portion of the drain electrodes 129. The passivation layer 130 is formed of silicon nitride or photo sensitive organic material.

The reflective patterns 150 are formed on the passivation layer 130, and the transparent electrode 160 is conformingly formed on the reflective patterns 150 and portions of the passivation layer 130. The reflective films 170 are conformingly formed on the transparent electrode 160 to have uneven and dimpled surface.

The pixel area defined by the first and the second signal lines 10 and 20 is divided into a reflective area RF and a transmissive area TR. The reflective patterns 150 and the reflective film 170 are formed selectively in the reflective area RF. The reflective patterns 150 are irregular hemispherical structures and looped curves in shape. The reflective patterns 150 are separated apart from one another to expose a portion of passivation layer 130 therebetween, with flat surfaces therebetween. The transparent electrode 160 is formed of a transparent conductor such as indium tin oxide (ITO), indium zinc oxide (IZO), or amorphous indium tin oxide (a-ITO). The reflective film 170 is formed selectively in the reflective area RF, such as by photolithography, from a reflective conductor such as aluminum (Al) or aluminum alloy. The transparent electrode 160 and the reflective film 170 are connected electrically to the drain electrode 129 through the contact hole 140. An alignment film (not shown) to align liquid crystal molecules can be formed on the reflective film and a portion of the passivation layer 130.

Figure 3:
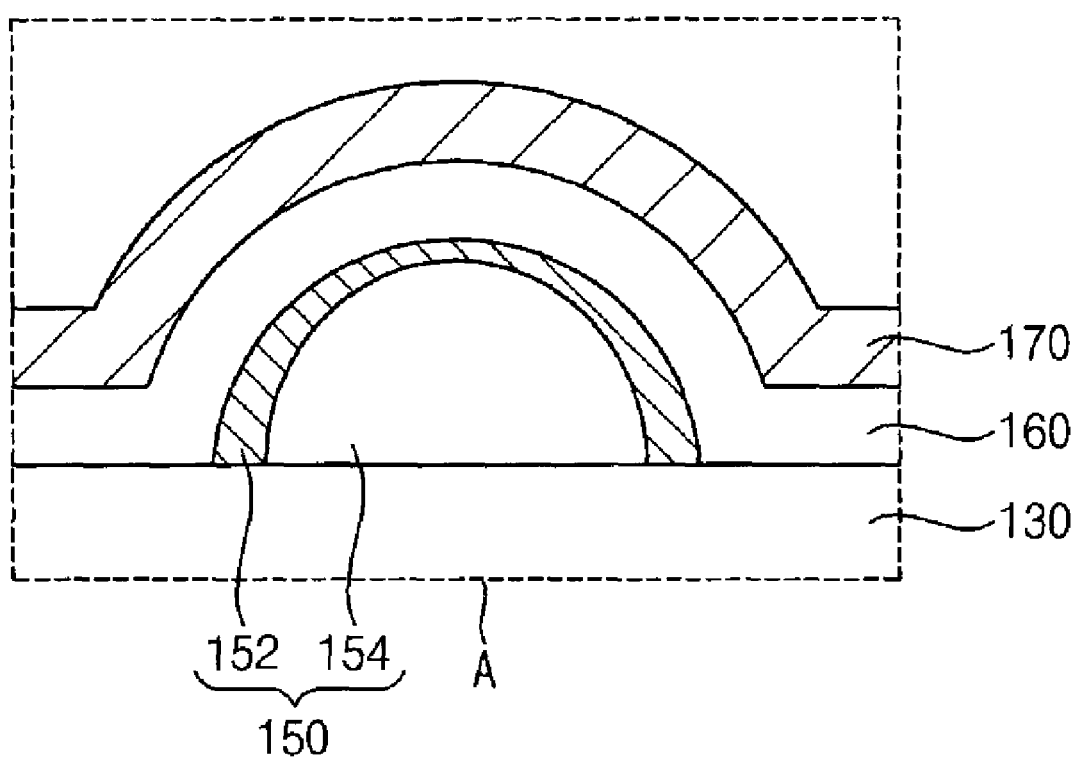
FIG. 3 is an enlarged detail view of the portion encircled by the dashed line "A" in FIG. 2.

FIG. 3 is an enlarged detail view of the portion encircled by the dashed line "A" in FIG. 2. The reflective pattern 150 is composed of a surface portion 152 and a core 154. The surface portion 152 includes a first polymer film or layer and the core 154 includes a second polymer film or layer. The polarity of the first polymer film is different from the polarity of the passivation layer 130, whereas the polarity of the second polymer film is the same as the passivation layer 130. At a step of forming the reflective pattern 150, the first polymer film is first deposited on the substrate 110 and then the second polymer film is deposited on the first polymer film. Heating the first and the second polymer films causes the position of the films to reverse, i.e., layer inversion. That is, the first polymer film rises and the second film sinks. During the position transition, tension in the first and the second polymer films causes the first and the second polymer films to separate, thereby forming the reflective patterns 150 having flat surfaces therebetween without a patterning process such as photo lithography. In detail, the passivation layer 130 defines flat surfaces between portions of the first polymer film since the passivation layer 130 is exposed through a space between portions of the first polymer film as a result of a separation of the first and second polymer films during layer inversion due to surface tension.

In one embodiment, the first polymer is formed of polystyrene (PS) and the second polymer is formed of polyvinylpyridine (PVP). Also, the first and the second polymers can include a photo-activating functional group and a photo-activating crosslinking group in a repeating unit, which reacts to crosslink the polymers, thereby strongly attaching the reflective patterns 150 to the passivation layer 130. The first and the second polymers are desired to be block copolymers because block copolymers can form various shapes during the position transition.

The cross-section of the reflective pattern 150 is substantially hemispherical in shape and the thickness of the surface portion 152 is irregular. The reflective patterns 150 are irregular in shape and size. The reflective patterns 150 formed by chemical properties (e.g., position transition by heat) of polymers reduce the number of photo lithography steps, thereby reducing cost for fabricating an LCD. In addition, the reflective patterns 150 have flat surfaces therebetween to reduce interference of reflected light from the neighboring reflective patterns 150. Also, the polymers used for the reflective patterns have high molecular weight to reduce the deformation of the reflective pattern 150 during the heating or crosslinking process.

Figure 4:
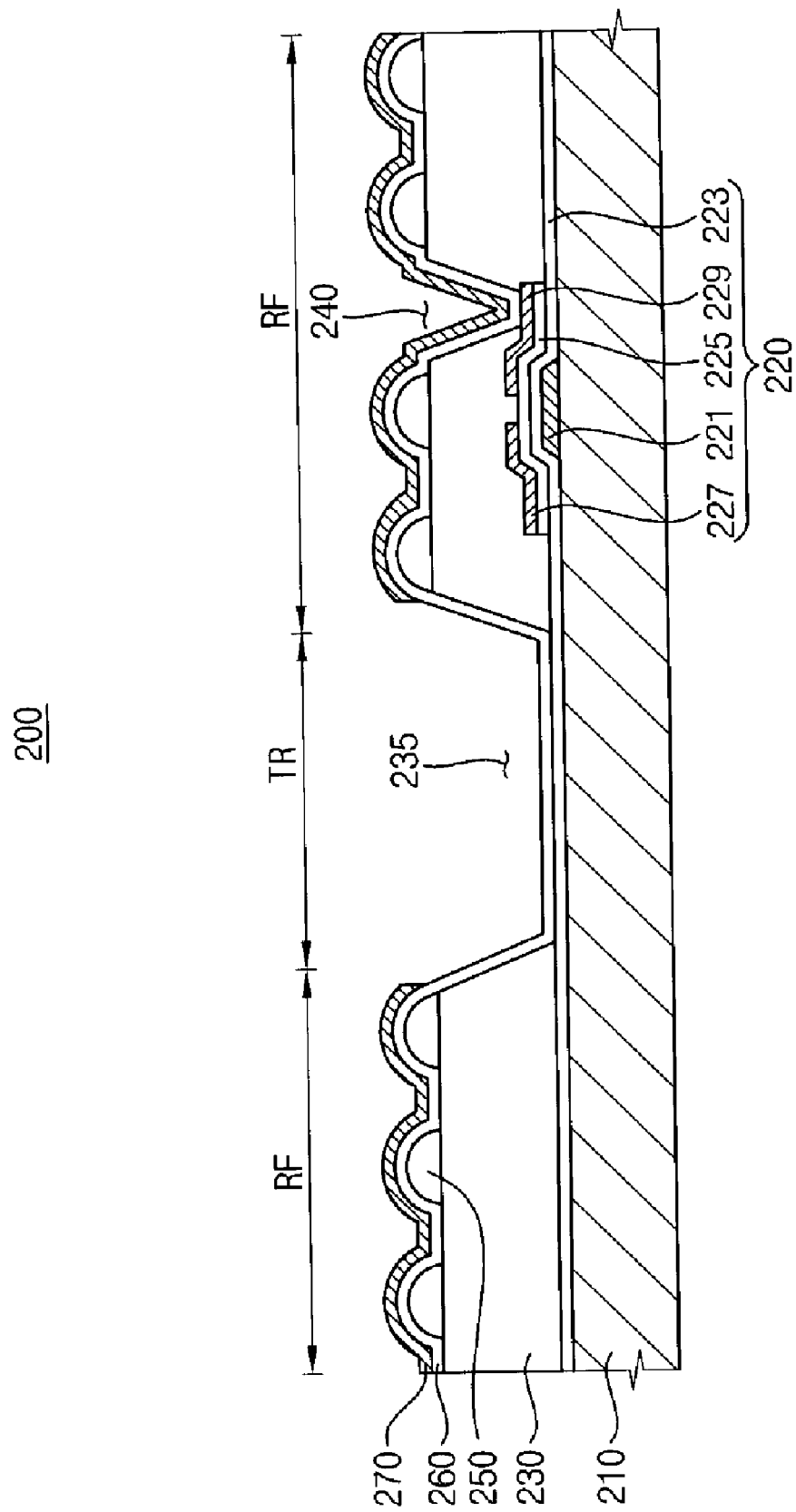
FIG. 4 is a cross-sectional view of another embodiment of a display panel according to the present invention.

FIG. 4 is a partial cross-sectional view of another embodiment of a display panel 200 which is substantially identical to the display panel 100 of FIG. 1, except for an additional passivation layer 230 having an opening 235 in a position corresponding to the transmissive area TR. The identical explanation will be skipped. The display panel 200 includes a substrate 200, a plurality of TFTs 220, the passivation layer 230, reflective patterns 250, transparent electrodes 260, and reflective films 270. Each TFT 220 includes a gate electrode 221, an insulating layer 223, a semiconductor layer 223, a source electrode 227, and a drain electrode 229. The passivation layer 230 has the opening 235 in the area corresponding to the transmissive area TR to expose the insulating layer 223.

The reflective patterns 250 are formed on the passivation layer 230, and the transparent electrode 260 is formed on the reflective patterns 250 and the exposed insulating layer 223. The reflective film 270 is formed on the transparent electrode 260. The reflective patterns 250 and the reflective film 270 are formed selectively in the reflective areas RF.

The cell gap of liquid crystal (not illustrated) in the transmissive area is greater in the reflective area because the thickness of the passivation layer 230 is different, thereby reducing luminance non-uniformity caused by an optical path difference in the transmissive and the reflective areas.

Figure 5:
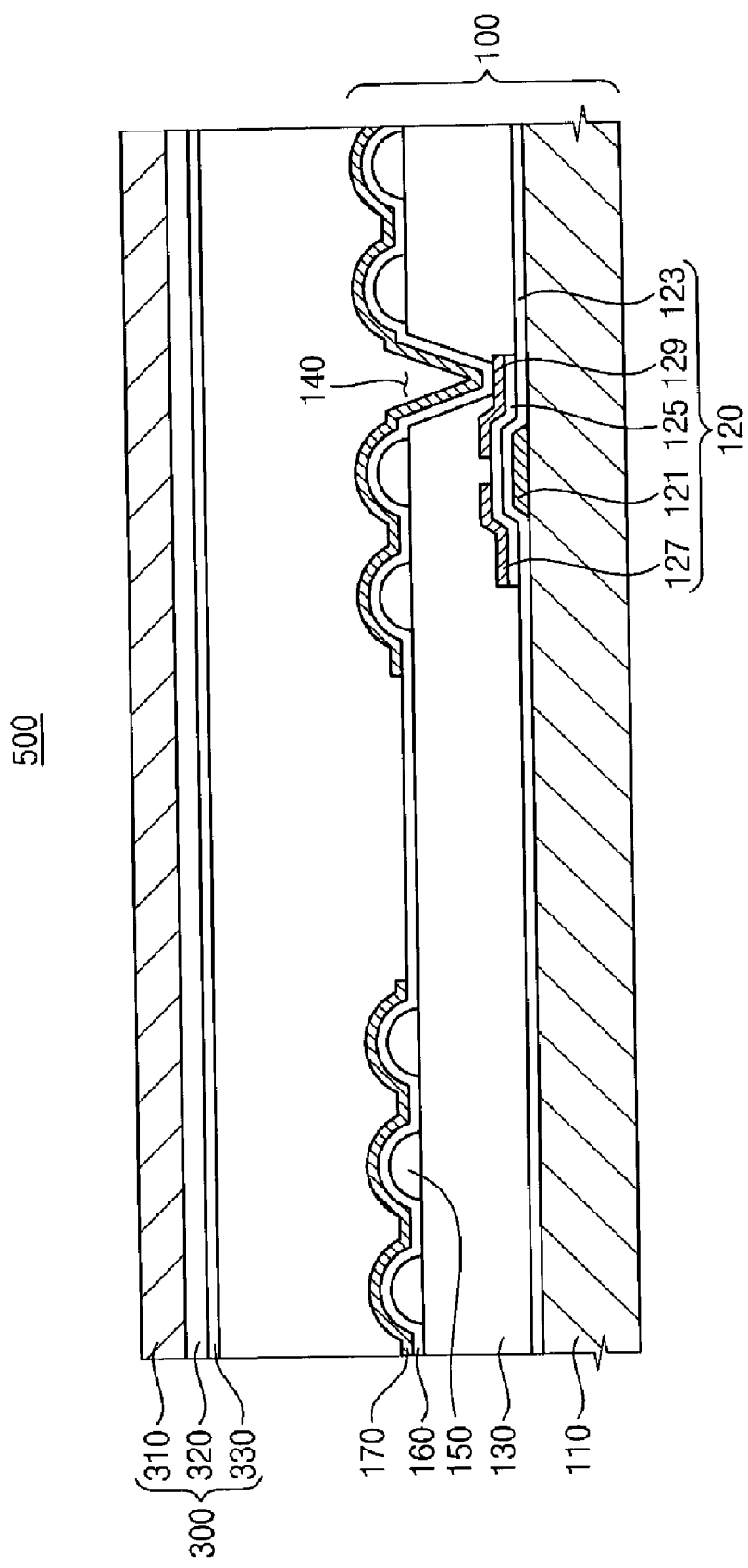
FIG. 5 is a cross-sectional view of an embodiment of a LCD according to the present invention.

FIG. 5 is a partial cross-sectional view of a LCD with the exemplary display panel 500 as shown in FIGS. 1 and 2. The liquid crystal display panel 500 includes a display panel 100 identical to those as shown in FIGS. 1 and 2, a counter panel or second display panel 300, and a liquid crystal layer 400 interposed therebetween.

The display panel 100 includes a substrate 110, a plurality of TFTs 120, a passivation layer 130, reflective patterns 150, transparent electrodes 160, and reflective films 170. Duplicated explanation will be skipped.

The counter panel 300 facing the display panel 100 includes an upper substrate 310, color filters 320 and a common electrode 330. The color filters 320 are formed in the area corresponding to the transparent electrode 160 of the display panel 100 and selectively transmit light having a specific wavelength, i.e., those corresponding to red, green, and blue (RGB) colors. The common electrode 330 is formed over the entire surface of the upper substrate 310.

The liquid crystal (LC) layer 400 is interposed between the display panel 100 and the counter panel 300. The LCD displays images by applying voltages to the transparent electrode 160 and the common electrode 320 to generate an electrical field in the LC layer 400, which controls the orientation of the LC molecules in the LC layer 400 to effect the polarization of light passing or reflected through the layer.

Figure 6:
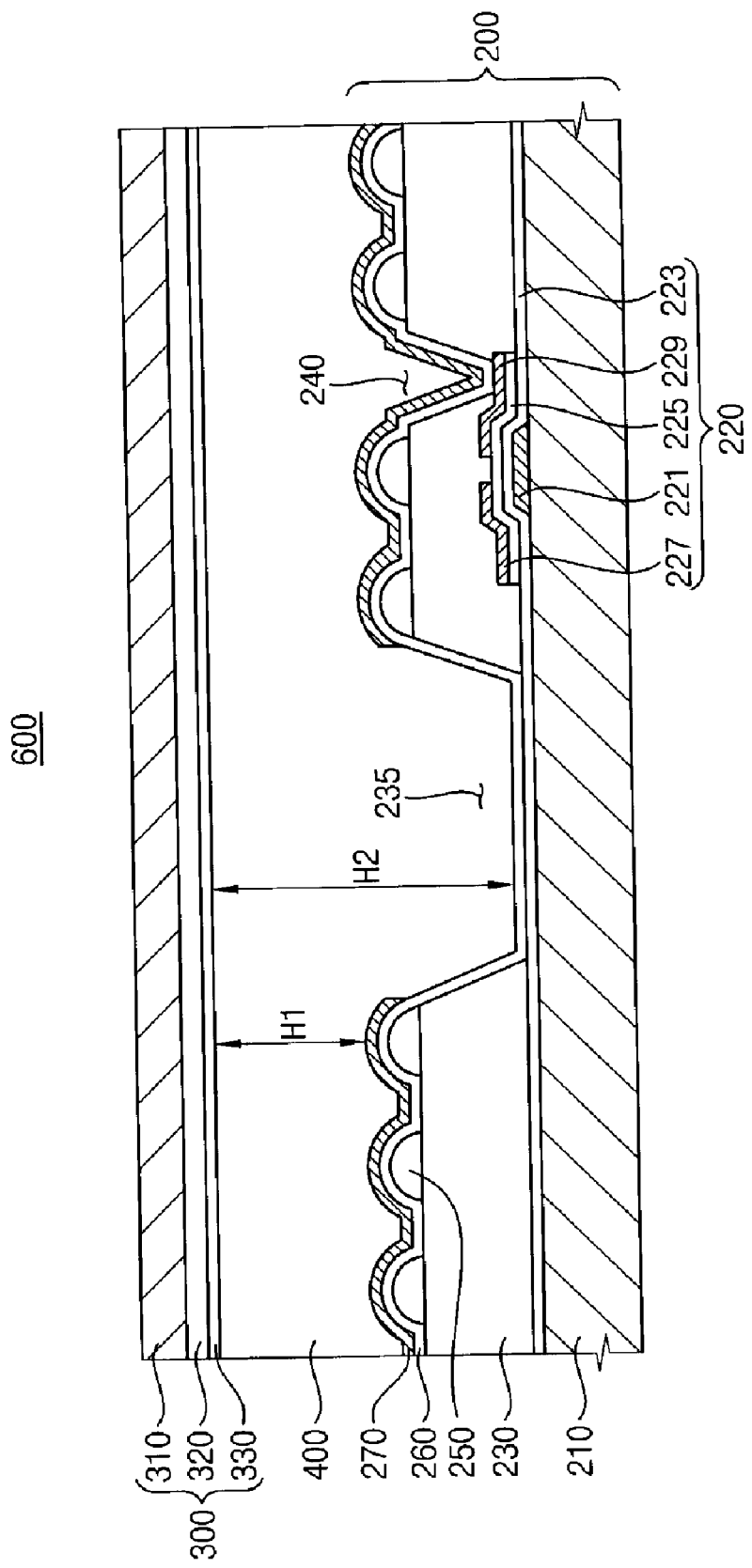
FIG. 6 is a cross-sectional view of another embodiment of a LCD according to the present invention.

FIG. 6 is a cross-sectional view of an LCD 600 with the exemplary display panel 200 as shown in FIG. 4, which is substantially identical to the LCD 500. Duplicated explanation will be skipped. The LCD 600 includes display panel 200, a counter panel 300 and a liquid crystal (LC) layer 400.

The display panel 200 includes a substrate 210, a plurality of TFTs 220, a passivation layer 230, reflective patterns 250, transparent electrodes 260, and reflective films 270. The passivation layer 230 has an opening 235 in the area corresponding to a transmissive area. The counter panel 300 facing the display panel 200 includes an upper substrate 310, color filters 320, and a common electrode 330.

The cell gap H1 of the LC layer 400 in the reflective area is less than the cell gap H2 in the transmissive area, thereby reducing luminance non-uniformity caused by an optical path difference in the transmissive and the reflective areas.

Hereinafter, a method for manufacturing a display panel according to an embodiment of the present invention will be described in detail by referring to FIGS. 7 to 15.

Figure 7:
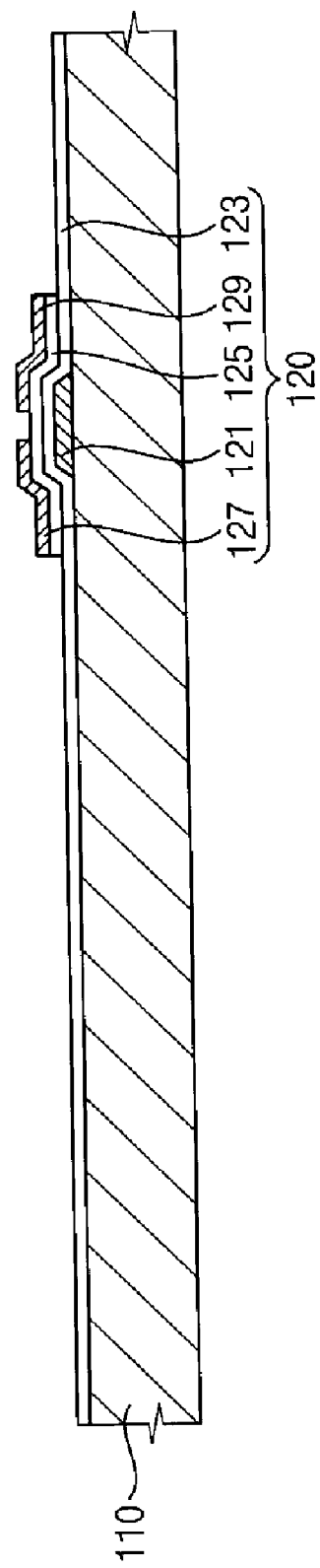
FIGS. 7 to 15 are cross sectional views showing various process steps for forming a display panel according to an embodiment of the present invention.

FIG. 7 is a cross-sectional view showing a TFT formed on a substrate. A plurality of first signal lines (not shown) are formed on a substrate 110 by depositing and patterning a metal film. A portion protruding from each first signal line forms a gate electrode 121. An insulting layer 123 made of organic or inorganic material is formed on the gate electrode 121 and the substrate 110. A semiconductor layer 125 is formed on the insulating layer 123 in the area corresponding to the gate electrode 121 by depositing and patterning semiconductor material such as amorphous silicon or polysilicon. When a gate-on voltage is applied to the gate electrode 121, a channel is formed on the surface of the semiconductor layer 125.

A metal film is formed on the entire substrate having the semiconductor layer 125 and patterned to form a plurality of second signal lines (not shown), source electrodes 127 protruded from each second signal line, and drain electrodes 129. The second signal lines cross the first signal lines and transmit data signals. A source electrode 127 and drain electrode 129 pair is disposed on the associated semiconductor layer 125. The gate electrode 121, the semiconductor layer 125, and the source electrode 127 and drain electrode 129 pair form a TFT 120.

Figure 8:
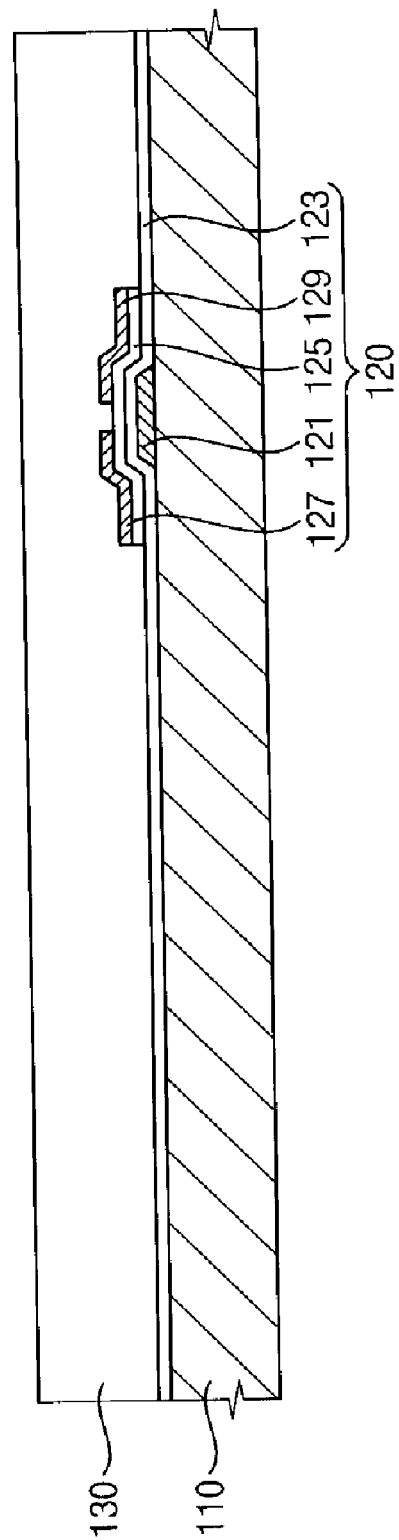

FIG. 8 is a cross-sectional view for illustrating a step following those as shown in FIG. 7. A passivation layer 130 is formed on the entire substrate to cover the TFTs 120, such as by spin coating or slit coating. The passivation layer 130 is formed of silicon nitride. In another embodiment, the passivation layer can be made of organic material including negative or positive photoresist.

Figure 9:
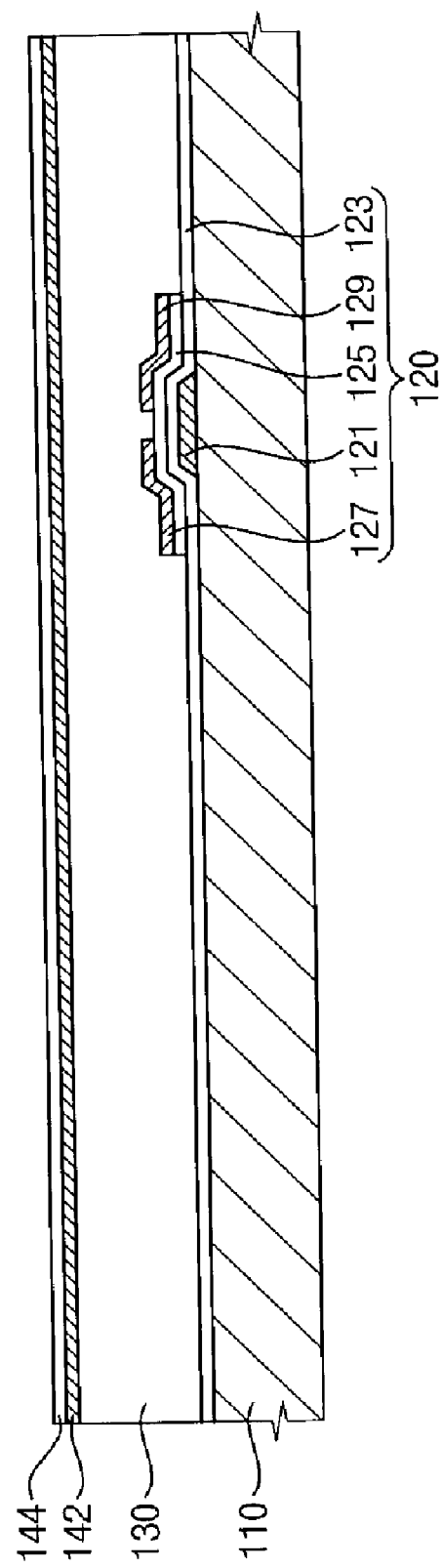
Figure 10:
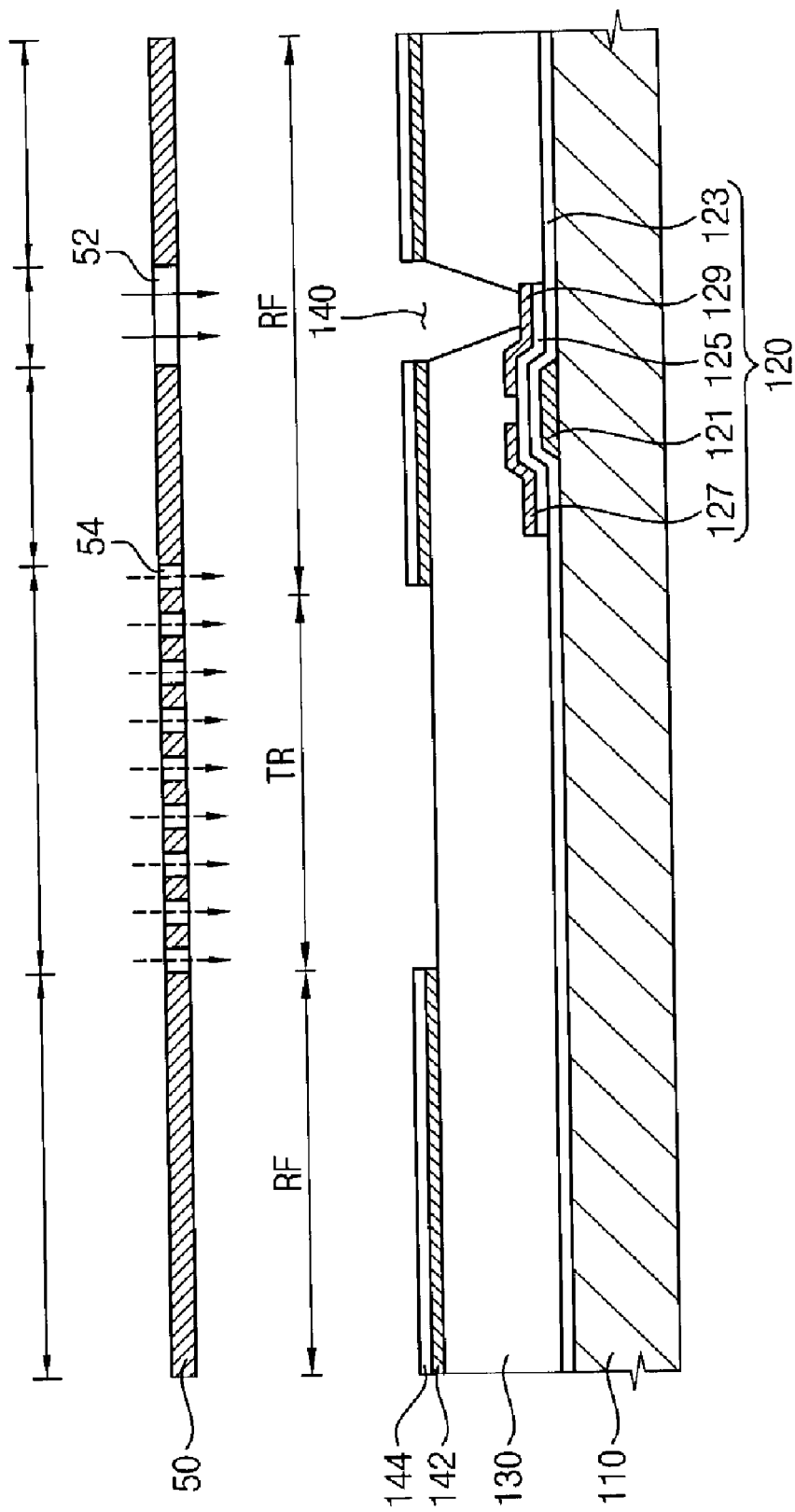

FIG. 9 is a cross-sectional view illustrating a step following those as shown in FIG. 8. A first polymer film 142 and a second polymer film 144, which can be of polystyrene (PS) and polyvinylpryridine (PVP), respectively, are formed consecutively on the passivation layer 130. The first and the second polymer films 142 and 144 may include a block-copolymer, which self-assembles by heat to form various shapes, such as a lamellar, cubic, or gyroidal shape. The polarity of the first polymer film 142 is different from the passivation layer 130, whereas the polarity of the second polymer film 144 is same as the passivation layer 130. The first and the second polymer films 142 and 144 can include a photo activating functional group and a photosensitive bridging agent. This enables the repeating unit to cross-link the reflective patterns, resulting in a strong adherence to the passivation layer 130. FIG. 10 is a cross-sectional view illustrating a step following those as shown in FIG. 9. The first and the second polymer films 142 and 144 and the passivation layer 130 are patterned by photo lithography using a photo mask 50. The photo mask 50 includes an opaque part A, a semi-transparent part B having a plurality of slits 54, and a transparent part C. The first and the second polymer films 142 and 144 in the area corresponding to the part A remain after exposing the films to light and developing. In the area corresponding to the part B, the first and the second polymer films 142 and 144 are removed and the passivation 130 remains after exposing to light and developing, whereas the first and the second polymer films 142 and 144 and the passivation layer 130 in the area corresponding to the part C are removed to form a contact hole 140 to expose a portion of the drain electrode 129.

In another embodiment, the semi-transparent part B can be replaced by the transparent part C to remove the passivation layer 130, thereby forming the display panel 200 as shown in FIG. 4.

Figure 11:
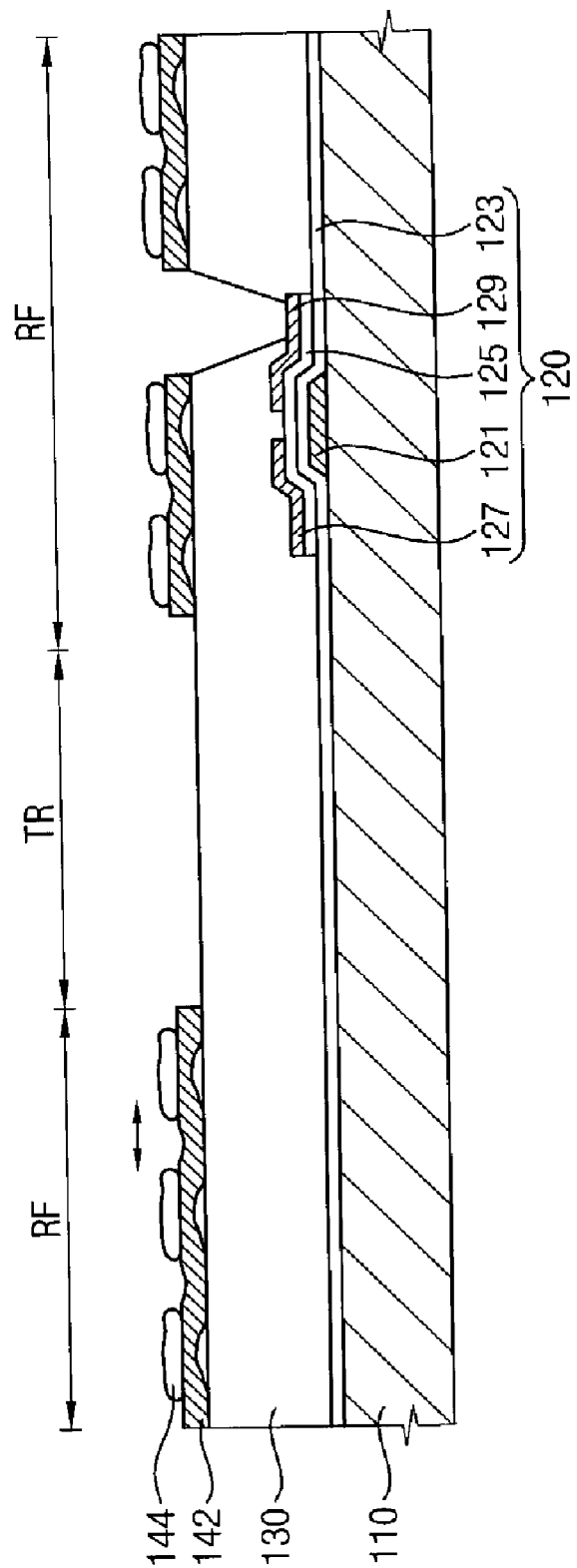

FIG. 11 is a cross-sectional view for illustrating a step following those as shown in FIG. 10. Heating the first and second polymer films 142 and 144 causes tension in the films 142 and 144, thereby causing a position transition therebetween, i.e., the first polymer film 142 rises and the second polymer film 144 sinks for layer inversion. During the position transition, the first polymer film 142 is separated into a plurality of patterns. The first and the second polymer films 142 and 144 can be selectively heated, either directly or indirectly through the substrate 110.

Figure 12:
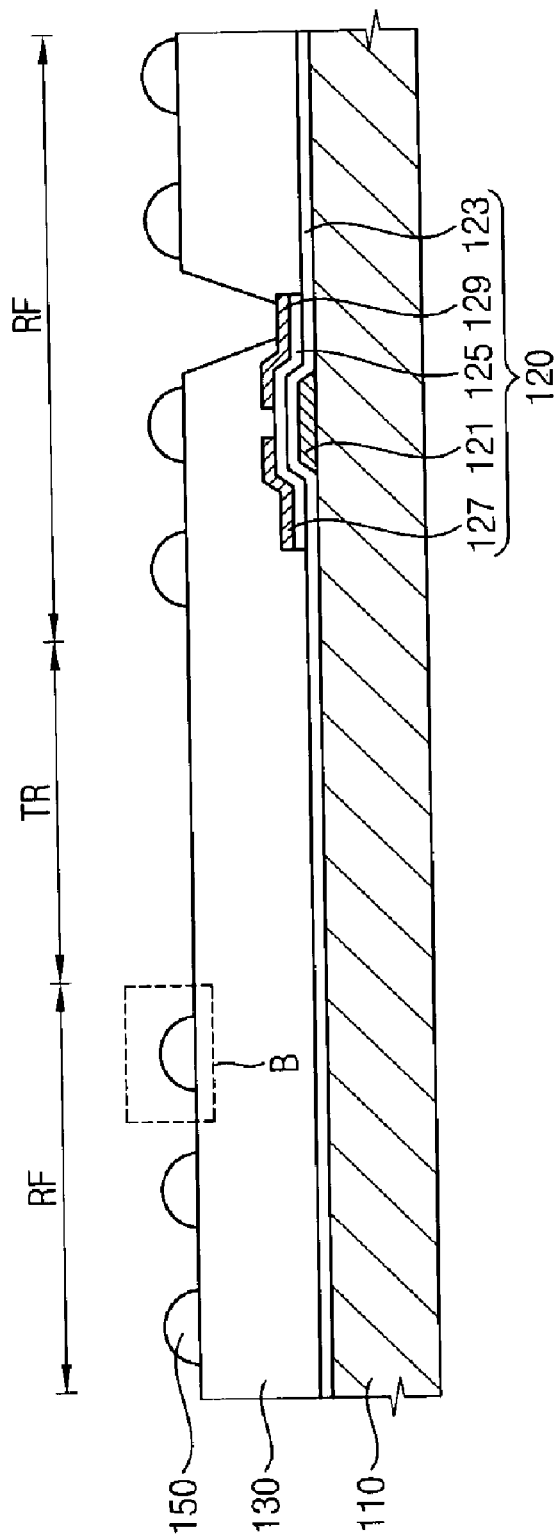
Figure 13:
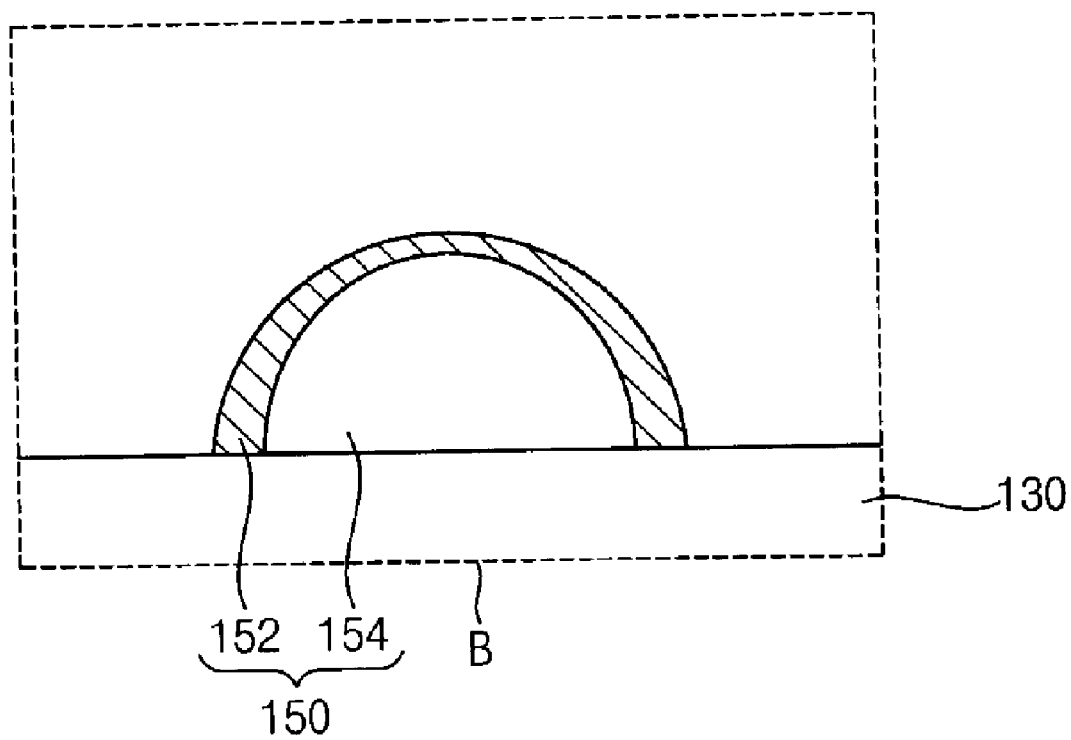

FIG. 12 is a cross-sectional view for illustrating reflective patterns formed on the passivation layer 130, and FIG. 13 is an enlarged detail view of the portion of the reflective pattern encircled by the dashed line "B" in FIG. 12.

A plurality of reflective patterns 150 is formed on the passivation layer 130 after the position transition of the polymer films in the area corresponding to the reflective area RF. Flat surfaces are formed between neighboring reflective patterns 150. The cross-sectional view of the reflective patterns 150 is substantially hemispherical in shape. The plan view of the reflective patterns 150 is an irregular closed-looped curve. The sizes and shapes of the reflective patterns 150 are various and irregular for enhanced light reflectivity.

Referring to FIGS. 11 and 13, the reflective pattern 150 includes a surface portion 152 and a core 154. The first polymer film 142 of FIG. 11 rises and is separated into a plurality of patterns to form the surface portion 152. The second polymer film 144 of FIG. 11 sinks to form the core 154. Irregular position transition causes the thickness of the surface 152 to be non-uniform.

Figure 14:
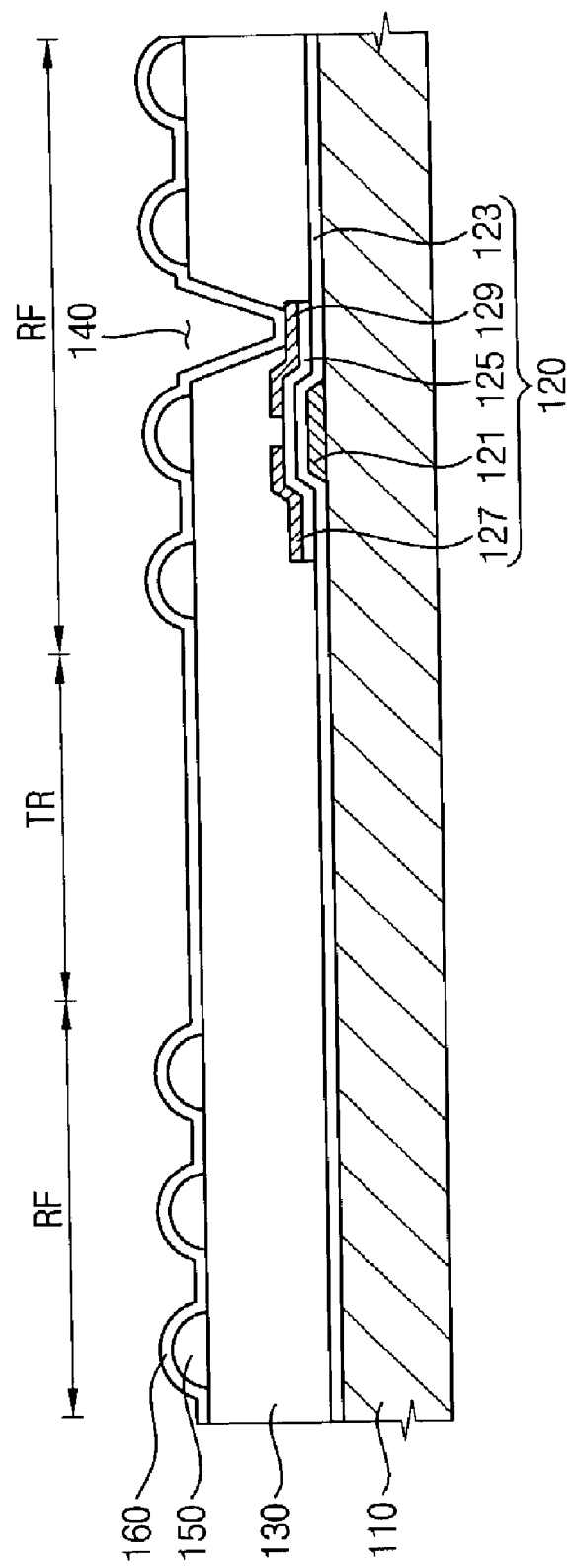

FIG. 14 is a cross-sectional view for illustrating a step following those as shown in FIG. 13. A transparent conductor such as indium tin oxide (ITO), indium zinc oxide (IZO), or amorphous indium tin oxide (a-ITO), is conformingly formed on the passivation layer 130 and the reflective patterns 150 and patterned to form transparent electrodes 160, e.g., pixel electrodes. The transparent electrode 160 is formed in both of the transmissive and the reflective areas and in the contact hole 140 to connect electrically to the drain electrode 129. The transparent electrode 160 has an uneven and dimpled surface conforming to the structure of the reflective patterns 150.

Figure 15:
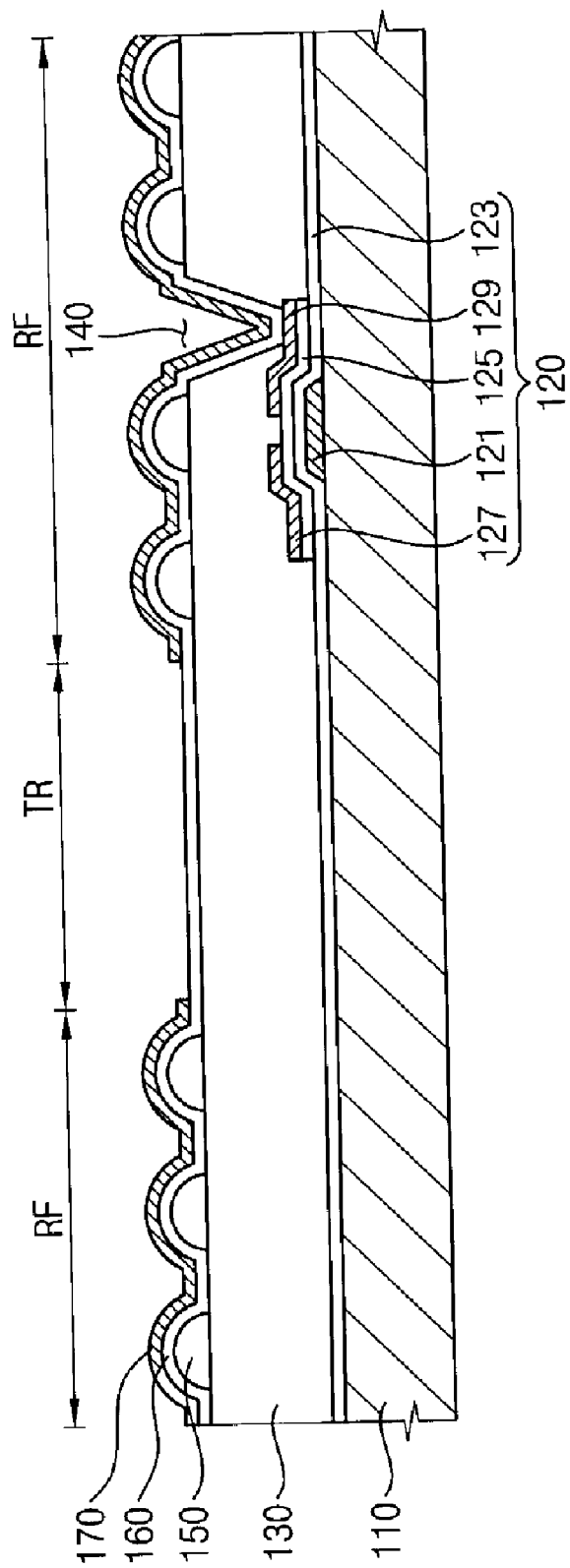

FIG. 15 is a cross-sectional view for illustrating a step following those as shown in FIG. 14. A reflective conductor, such as aluminum or alloy thereof, is conformingly formed on the transparent electrode 160 and patterned by photolithography to form reflective films 170 in the reflective area RF. The reflective films 170 have an uneven and dimpled surface conforming to the structure of the transparent electrode 160. The reflective films 170 can be formed in the contact hole 140. Accordingly, a display panel according to one embodiment of the invention is thereby formed.

In accordance with the embodiments of the present invention described and illustrated herein, the reflective patterns of a LCD device are formed by a position transition of two polymer films having different polarities, thereby reducing the number of photo lithography steps to form a reflective pattern and accordingly the cost for manufacturing a LCD device. Also, the reflective patterns are irregular in shape and size and have flat surfaces therebetween, thereby reducing the interference of reflected light and enhancing light reflectance.

As those of skill in this art will appreciate, many modifications, substitutions and variations can be made in the materials, apparatus, configurations and methods of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A display panel comprising:
    a substrate having a pixel area divided into a transmissive area and a reflective area;
    a thin film transistor formed in the pixel area;
    a passivation layer formed over the thin film transistor;
    a plurality of reflective patterns formed over the passivation layer in the area corresponding to the reflective area, wherein the reflective patterns comprise a first and a second polymer film having different polarities;
    a transparent electrode formed over the reflective patterns; and,
    a reflective film formed on the transparent electrode in the area corresponding to the reflective area wherein the reflecting patterns comprised of a surface portion and a core portion that are unevenly formed under the transparent electrode.

2. The display panel of claim 1, wherein the reflective patterns have irregular closed-looped curve shapes on a planar plane.

3. The display panel of claim 2, wherein the reflective patterns are irregular in size.

4. The display panel of claim 1, wherein portions of the passivation layer are not covered by the reflective patterns.

5. The display panel of claim 4, wherein the portions are flat.

6. The display panel of claim 1, wherein the passivation layer in the area corresponding to the transmissive area is thinner than the passivation layer in the area corresponding to the reflective area.

* * * * *